(12) United States Patent
How

(10) Patent No.: US 7,239,240 B1
(45) Date of Patent: Jul. 3, 2007

(54) METHOD AND APPARATUS FOR IMPLEMENTING SECURITY PROTECTION OVER RFID

(76) Inventor: Hoton How, 262 Clifton St., Belmont, MA (US) 02478

( * ) Notice: Subject to any disclaimer, the term of this patent is extended or adjusted under 35 U.S.C. 154(b) by 275 days.

(21) Appl. No.: 11/058,578

(22) Filed: Feb. 16, 2005

(51) Int. Cl.
*G08B 13/14* (2006.01)

(52) U.S. Cl. .................. 340/571; 340/551; 340/568.1; 340/572.4; 340/572.6

(58) Field of Classification Search ............ None
See application file for complete search history.

(56) References Cited

U.S. PATENT DOCUMENTS

| | | | | |
|---|---|---|---|---|
| 5,406,263 A * | 4/1995 | Tuttle | ................ | 340/572.1 |
| 5,939,984 A * | 8/1999 | Brady et al. | ............ | 340/572.1 |
| 5,955,951 A * | 9/1999 | Wischerop et al. | ...... | 340/572.8 |
| 6,121,878 A * | 9/2000 | Brady et al. | ............ | 340/572.1 |
| 6,169,483 B1 * | 1/2001 | Ghaffari et al. | .......... | 340/572.3 |
| 6,232,870 B1 * | 5/2001 | Garber et al. | .............. | 340/10.1 |
| 6,577,238 B1 * | 6/2003 | Whitesmith et al. | ..... | 340/572.1 |
| 6,646,554 B1 * | 11/2003 | Goff et al. | ............... | 340/572.6 |
| 6,744,366 B2 * | 6/2004 | How | ......................... | 340/571 |
| 7,109,867 B2 * | 9/2006 | Forster | .................... | 340/572.3 |
| 2004/0233042 A1 * | 11/2004 | Piccoli et al. | .............. | 340/10.1 |

* cited by examiner

*Primary Examiner*—Benjamin C. Lee
*Assistant Examiner*—Son Tang

(57) ABSTRACT

Disclosed is one method and one apparatus which teach improved techniques in equipping an RFID with security measure. Conventionally an RFID is employed basically to replace the usage of an infrared bar-code label thereby to supply electronic or digital signature and identification. In this sense, the traditional RFID technology is in lack of security and an RFID can be tampered with in an arbitrary manner not to cause an alert. This is no longer true if an RFID is endowed with security. In this invention an RFID, either an active or a passive device, has the ability to memorize its original spatial position so that if the position is changed without authority, an alarm signal is generated.

11 Claims, 2 Drawing Sheets

METHOD AND APPARATUS FOR IMPLEMENTING SECURITY PROTECTION OVER RFID

CROSS REFERENCE TO RELATED APPLICATIONS (Not Applicable)

FEDERALLY SPONSORED RESEARCH (Not Applicable)

SEQUENCE LISTING OR PROGRAM (Not Applicable)

BACKGROUND OF INVENTION

1. Field of Invention

This invention is directed to one method and one apparatus to add security protection to an RFID. More specifically, this invention teaches to protect an RFID from being moved or disturbed without authority when deployed at a specific position.

2. Prior Art

Three years after the terror attacks of Sep. 11, 2001, the U.S. Government has done a great deal to make the country more secure, but America is, and may always be, a nation at risk. For one thing, the country's transportation system is still perilously exposed.

The United States has been a leader in trying to make world trade open and efficient, inexpensive and reliable. Much of the world's commerce moves in cargo containers—18 million containers are constantly on the move in the world, with 7 million cargo containers arriving in the United States every year. The risk is that virtually anyone in this country can receive a container which can be filled with up to 32 tons of hazardous material, and there are very few safeguards to check it. Last year, for example, ABC News tested port security by loading depleted uranium into a container in Indonesia and shipping it successfully through the port of Los Angeles.

The real concern is not that its response would diminish gradually and people would be disturbed or harmed only in the restricted local vicinity, but rather it is that it is conceivable a few other same containers are to be moved into US ports either concurrently or sequentially. Two simultaneous attacks targeting different ports of entry in different parts of the country would simply multiply the terror and the chaos. The consequences are thus global and catastrophic. After the occurrence of the first or the second event, the likely reaction from the U.S. government is to shut down U.S. seaports to sort and check things out. However, by closing US seaports, for a period of two to three weeks, say, the world's trade system is to be essentially shut down, so do the US manufacturing and retailing sectors. Wal-Mart will then have no sales, since there is nothing left on the shelves, and General Motors will then have no jobs, since no assembly is possible for making cars and trucks.

A possible solution is to use a radioactive scanner to generate an interior image of the cargo container. In that way it allows an inspector to see into the container if it carries bananas and not some big black object, for example. However, a radioactive probe will create side effects influencing seriously human health, bringing about contamination of the shipped bananas, and leaving behind tons of nuclear wastes in the planet earth, although the radiation levels may be low.

Another solution is to establish a tracking system along with every of the containers to be shipped worldwide. For this purpose RFID (Radio Frequency Identification) tags are attached to the cargo containers which carry proprietary information to be managed through networked computers. Although an RFID is able to identify a cargo container, it does not imply security. Like a conventional infrared barcode label, an RFID can be removed, tampered with, or counterfeited in easy ways, and the cargo items inside the container can be altered or substituted intentionally and unconsciously. This renders an RFID useless when talking about security.

Other situations may also require an RFID to be equipped with security. For example, in the near future a passport will carry an RFID to provide unique identification. However, an RFID can be transplanted from one passport to another with its contents altered or substituted concurrently thereby defeating fidelity and hence security.

OBJECTS AND ADVANTAGES

Accordingly, it is an object of the invention to address one or more of the foregoing disadvantages or drawbacks of the prior art, and to provide such an improved method and apparatus to obtain security protection over an RFID tag deployed at a specific position. For an active RFID its security environment is constantly monitored so that the alarm conditions are generated whenever securities are violated. For a passive RFID the security environment is reported upon interrogation by a reader device thereby to determine the security violation conditions. The added security measure consumes insignificant power. Most importantly, it can be integrated with the RFID not to increase much the complexity of the overall circuit so as to minimize volume and costs.

Other objects will be apparent to one of ordinary skill, in light of the following disclosure, including the claims.

SUMMARY

In one aspect, the invention provides a method which allows security measure to be added to an RFID so that disturbances to the position of the RFID can be readily detected. For this purpose magnetic markers are deployed setting up a characteristic local magnetic environment. A magnetic sensors is employed which check against changes made to this previously established local magnetic environment. Alarms arise if changes are detected exceeding some threshold values indicating the security violation conditions.

In another aspect, the invention provides an apparatus which endows an RFID with security measure. The security operation is powered by the RFID circuit either from a battery, an active RFID, or from the interrogation rf electromagnetic fields, a passive RFID. Magnetic markers are employed to set up a characteristic local magnetic environment. For an active RFID the local magnetic environment is constantly monitored upon which the alarm conditions are generated if it has been changed significantly beyond some threshold values. For a passive RFID the local magnetic environment is reported upon rf interrogation by a reader device thereby to allow the determination if the security conditions are violated.

DRAWINGS

Figure

For a more complete understanding of the nature and objectives of the present invention, reference is to be made to the following detailed description and accompanying drawing, which, though not to scale, illustrate the principles of the invention, and in which.

| References Numerals | |
| --- | --- |
| 001 | RFID |
| 002 | Security Measure/Magnetic Sensor |
| 003 | Magnetic Marker |
| 004 | Container (Package) |
| 005 | Doorway (Cover) |
| 006 | Cargo (Merchandise) |

DETAILED DESCRIPTION

Figure 1:
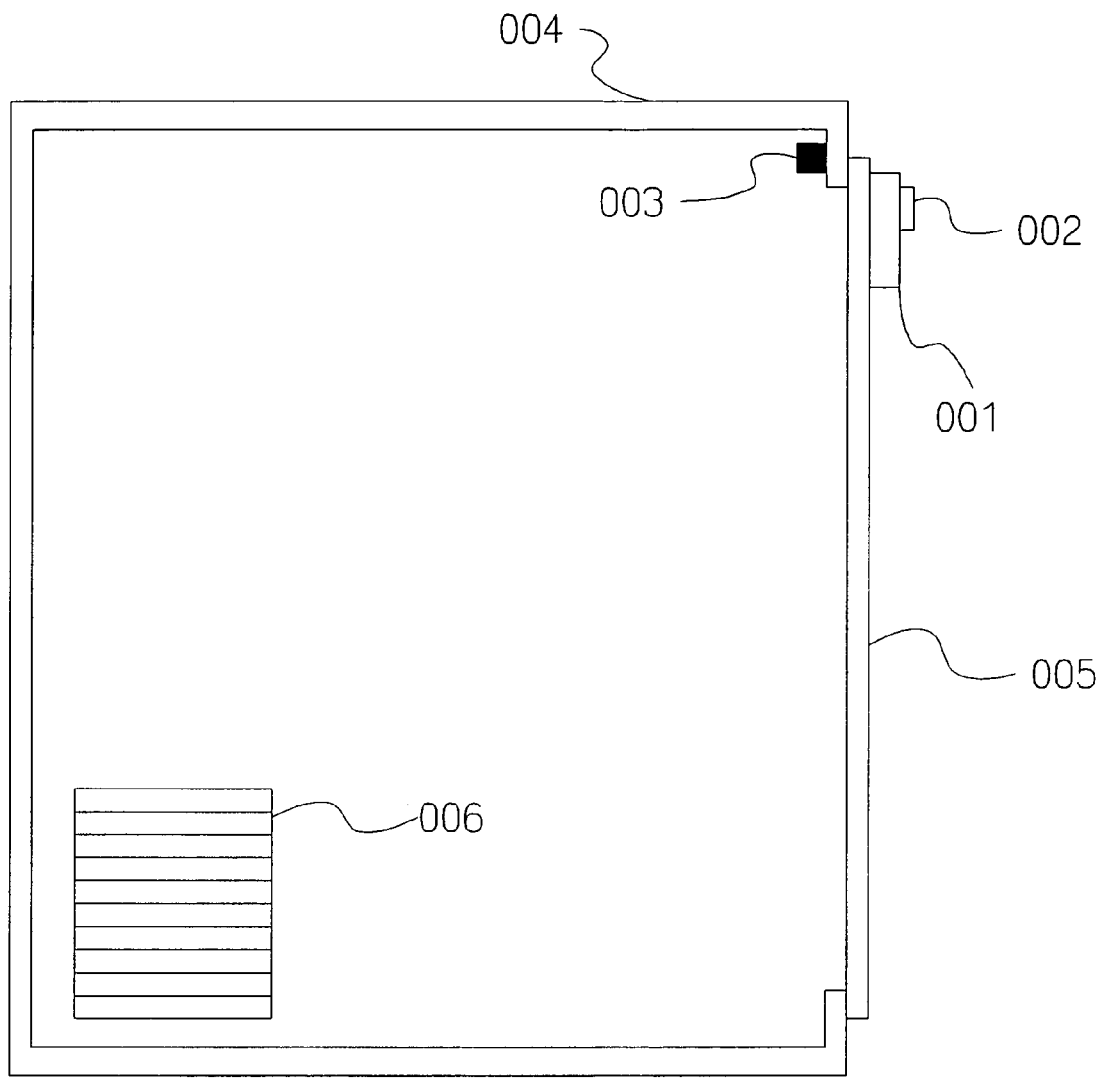
FIG. 1 shows one example of the preferred embodiment of the invention that an RFID is deployed endowed with security measure providing identification of as well as protection over a container or a package carrying cargo or merchandise.

One Preferred Embodiment of the Present Invention:—FIG. 1

To illustrate the present invention an explicit example is given in FIG. 1 in which Security Measure 002 is combined with RFID 001 providing identification of Container 004. In FIG. 1 Cargo 006 is shown inside Container 004 whose Doorway is 005. In FIG. 1 Marker 003 is attached to the interior side of Container 004 capable of generating a local magnetic environment to be sufficiently characterized by Security Measure 002, which essentially contains a Magnetic Sensor to be integrated with RFID 001. That is, in FIG. 1, Security Measure 002 is able to characterize the local magnetic environment set up by Magnetic Marker 003 so that security violation conditions can be readily detected if the local magnetic environment is changed beyond some threshold values. Security violations can result from two conditions: either the assembly of RFID 001 and Security Measure 002 is removed from Doorway 005 or Doorway 005 is opened relative to Container 004. Both conditions can change the local magnetic environment thereby causing the assembly to release alarms to announce the security violation conditions.

In FIG. 1 004 can also be Package with Cover 005 which together wrap around Merchandise 006. Again, Marker 003 is attached to the inside of Package 004 setting up a local magnetic environment to be sufficiently characterized by Security Measure 002 integrated with RFID 001. If the assembly of RFID 001 and Security Measure 002 is removed from Cover 005 or Cover 005 is torn open relative to Package 004, security violation conditions occur, causing local magnetic environment to change to be subsequently detected by Security Measure 002, thereby activating an alarm to indicate so. FIG. 1 is shown for general purposes and applications other than a cargo container and a merchandise package are understood.

Figure 2:
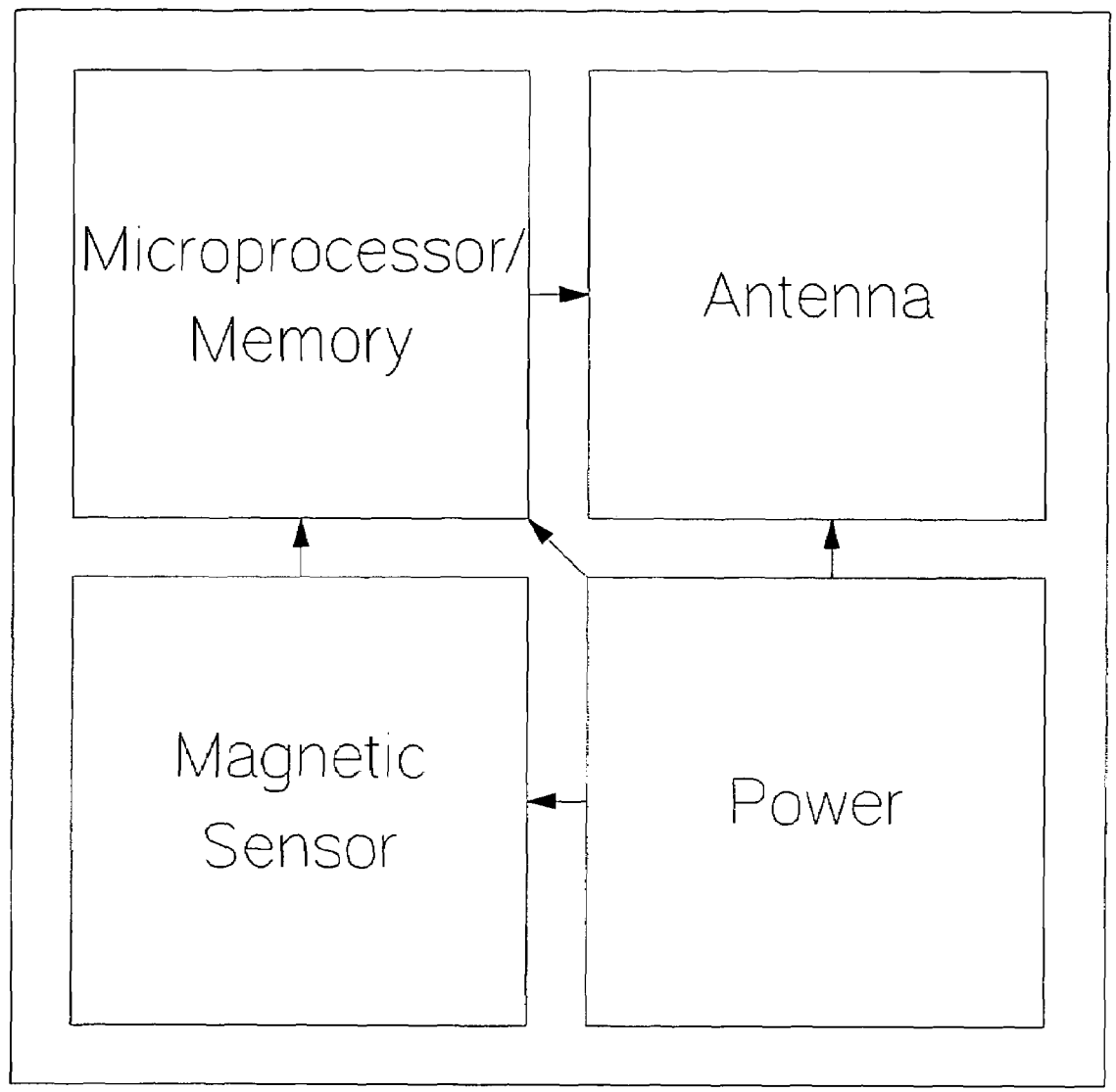
FIG. 2 shows another example of the preferred embodiment of the invention that an RFID circuit endowed with security measure is realized in 4 functional units: power unit, antenna unit, microprocessor/memory unit, and magnetic sensor unit.

One Preferred Embodiment of the Present Invention:—FIG. 2

To illustrate the present invention another explicit example is given in FIG. 2 which illustrate the functional units contained by the assembly of RFID 001 and Security Measure 002 shown in FIG. 1. In FIG. 2 4 units are identified performing the needed functions of power supply, and magnetic sensing, logistic management, and communication, denoted as, the Power unit, the Magnetic Sensor unit, the Microprocessor/Memory unit, and the Antenna unit, respectively. For an active RFID tag the Power unit shown in FIG. 2 is a battery which supplies power to the other 3 units shown in FIG. 2. At the idle state, i.e., the normal state without security violation, the operation of Security Measure involves the measurement of a large resistance and hence it consumes little power. As such, the Batter unit shown in FIG. 2 can be fabricated using a flexible thin-film lithium battery, for example, which can be recharged when needed. For a passive RFID tag Power unit shown in FIG. 2 denotes the rectifying circuit which effectively converts the rf power from the interrogation signal into a dc voltage thereby to support the operation of the other 3 units shown in FIG. 2.

The Magnetic Sensor unit shown is FIG. 2, or the Security Measure 002 shown in FIG. 1, measures the magnetic field at the RFID position. While many kinds of sensors are possible, including Hall probes, inductor coils, fluxgate magnetometers, SQUIDs, and magnetoresistance (MR) heads or sensors, it is probably of the most advantages to use an MR sensor with the Magnetic Sensor unit shown in FIG. 2. MR or (giant) GMR heads are generally used in hard-disk drives to detect magnetic digital signals at high flow rates. An MR or a GMR sensor involves an MR material, e.g. a nickel-iron alloy, whose resistance varies when a transverse magnetic field is applied, the MR effect. MR films can be transferred onto a semiconductor substrate admitting integration with the other circuit elements thereby facilitating total size reduction. Most importantly, an MR sensor implies a resistance in the order of 10-100 M$\Omega$, and power dissipation is thus insignificant. For an active tag it is thus feasible that the local magnetic environment can be constantly monitored reporting the security violation conditions in real time. For a passive tag the local magnetic environment is measured only when an interrogation signal is present whose rf power is to be picked up by the Power unit of FIG. 2. The measured local magnetic environment is then reported through the Antenna unit shown in FIG. 2 which is subsequently compared with the allowed threshold values to indicate if security conditions are violated.

The Microprocessor/Memory unit shown in FIG. 2 performs the logic specifying the alarm conditions, as well as undergoes electronic identification fulfilling the normal usage of an RFID. For an active tag, the measured electric voltage from the Magnetic Sensor unit, which is in proportion to the local magnetic environment at the tag position, is compared with a predefined window of voltages characteristic of the safe state, or the idle state; if the measured voltage falls beyond this predefined window, an alarm signal is generated, indicating the condition of security violation. The alarm signal may be modulated to further distinguish the security violation conditions at different levels or in different channels. Also, by modulating the alarm signal the signal-to-noise ratio is enhanced by the receiver circuit. For a passive tag the Microprocessor/Memory unit shown in FIG. 2 carries the original local magnetic environment at the tag position. Upon reception of an interrogation signal, the Magnetic Sensor unit shown in FIG. 2 iterates measurements on the local magnetic environment whose values are compared with the originally stored ones and alarms are released if security violation conditions are determined, in a manner analogous to the operation of an active tag just described. For both the active and the passive tags the original local magnetic environment at the tag position is stored in the Microprocessor/Memory unit, which may be updated at a later time if necessary, assuming the RFID is rewritable.

Powered by the Power unit, the Antenna unit shown in FIG. 2 is then able to communicate with the interrogation signal generated by the reader or the scanner reporting its identification as well as security contents. The only subject not discussed so far concerns the Magnetic Marker 003 shown in FIG. 1. A Magnetic Marker is a piece of a permanent magnet which is able to create a local magnetic environment ready to be characterized by the Magnetic Sensor unit of FIG. 2. In order to distinguish from the background field and not to cause much mutual interferences, the local field should be in the order of 5 gauss, which is 10 times the earth field. A local magnetic field of this magnitude can be readily obtained by using the conventional magnet materials. For example, at a separation of 1 cm a Metglass permanent tag can be used. At a larger separation distance, say, from 1 to 5 inches, ceramic magnets are appropriate. While a Metglass tag costs about $0.01, a ceramic magnet costs about $0.1-0.2 for a normal size. As such, the magnetic environment required by the local-field measurement depicted in FIG. 1 is inexpensive to achieve.

In FIG. 1 a single Magnetic Marker 003 is shown. A single Magnetic Marker may be sufficient for an active tag, and for a passive tag multiple markers are preferred. That is, when multiple markers are used which in collaboration create an irregular local magnetic pattern whose magnitude varies rapidly from one point to another, the RFID tag assembly 001 plus 002 shown in FIG. 1 once removed from its original position can hardly be placed back still showing an identical measurement in local magnetic environment. This is specially true if the measurement on local magnetic field is carried out in 3D by the Magnetic Sensor unit of FIG. 2 thereby to increase sensitivity and hence to decrease the rate of false alarms. Multiple magnetic markers may be preferentially used with an RFID providing security measure to defeat the attempts to counterfeit a passport or other regulatory items reinforcing vehicle/personnel access control.

CONCLUSIONS

The present invention teaches a method and an apparatus enabling security protection to be endowed with an RFID. The present invention allows the position of the RFID to be memorized with reference to one or a set of local magnetic markers so that disturbances to the position of the RFID can be readily detected thereby to announce the security violation conditions. The present invention can be applied to an active RFID tag powered by a battery or a passive RFID tag intercepting power from the interrogation signal transmitted by a reader device.

I claim:

1. A radio frequency identification (RFID) system endowed with security measure on a monitored surface, comprising:
at least one magnetic markers mounted on said monitored surface and setting up a local magnetic environment field pattern;
a passive RFID device comprising:
a microprocessor/memory unit providing logistics and data storage operation when performing identification and security measuring condition;
an antenna unit is configured of communicating with a reader or a scanner;
a power acquiring unit acquires power from said reader or scanner to support the operation of said RFID device and a magnetic sensor unit;
said magnetic sensor unit connected to said RFID device and is characterizing said local magnetic environment field pattern; and
wherein, an alarm signal or signals is generated and transmitted via said antenna unit to said reader or scanner to report a security violation condition, base upon changes in characteristic of said local magnetic environment pattern beyond a set of pre-specified threshold value or values, which said threshold value or values is stored in said microprocessor/memory unit.

2. The RFID system endowed with security measure of claim 1, wherein said power-acquiring unit acquires power from radiation signal transmitted by said reader or a scanner.

3. The RFID system endowed with security measure of claim 1, wherein the RFID system endowed with security measure is disturbed due to unauthorized change in position and/or in orientation occurring between said passive RFID device in reference to said at least one magnetic markers.

4. The RFID system endowed with security measure of claim 1, wherein said data storage operation maneuvered by said microprocessor/memory unit contains dynamic information on said local magnetic environment field pattern, which can be updated when deemed necessary.

5. The RFID system endowed with security measure of claim 1, wherein said logistics operation maneuvered by said microprocessor/memory unit compare said local magnetic environment field pattern with said set of said pre-specified threshold value or values.

6. The RFID system endowed with security measure of claim 1, wherein said local magnetic environment field pattern involves 1D, 2D, or 3D vector-field measurements.

7. A method of obtaining security measure with a radio frequency identification (RFID) system endowed with security measure on a monitored surface, comprising the steps of:
utilizing at least one magnetic markers mounted on said monitored surface and setting up a local magnetic environment field pattern;
providing a passive RFID device comprising a microprocessor/memory unit providing logistics and data storage operation when performing identification and security measuring condition, including an antenna unit is configured of communicating with a reader or a scanner;
powering said passive RFID device and a magnetic sensor unit from said reader or scanner to support the operation of said passive RFID device and said magnetic sensor unit;
characterizing said local magnetic environment field pattern by said magnetic sensor unit connected to said passive RFID device; and
transmitting an alarm signal or signals via said antenna unit to said reader or scanner to report a security violation condition, base upon changes in characteristic of said local magnetic environment field pattern beyond a set of pre-specified threshold value or values, which said threshold value or values is stored in said microprocessor/memory unit.

8. The method of the RFID system endowed with security measure of claim 7, wherein said passive RFID device not requiring a battery to operate.

9. The method of the RFID system endowed with security measure of claim 7, wherein said passive RFID device and said magnetic sensor measure said local magnetic environment field pattern when power is provided by said reader device or said scanner device.

10. The method of the RFID system endowed with security measure of claim 7, wherein said security violation condition results from movement of said passive RFID device in reference to said at least one magnetic markers.

11. The method of the RFID system endowed with security measure of claim 7, wherein said local magnetic environment pattern involves 1D, 2D, or 3D vector-field measurements.

* * * * *